Jan. 26, 1971     D. W. BARR     3,557,559
WAVE-GENERATING APPARATUS
Filed May 12, 1969
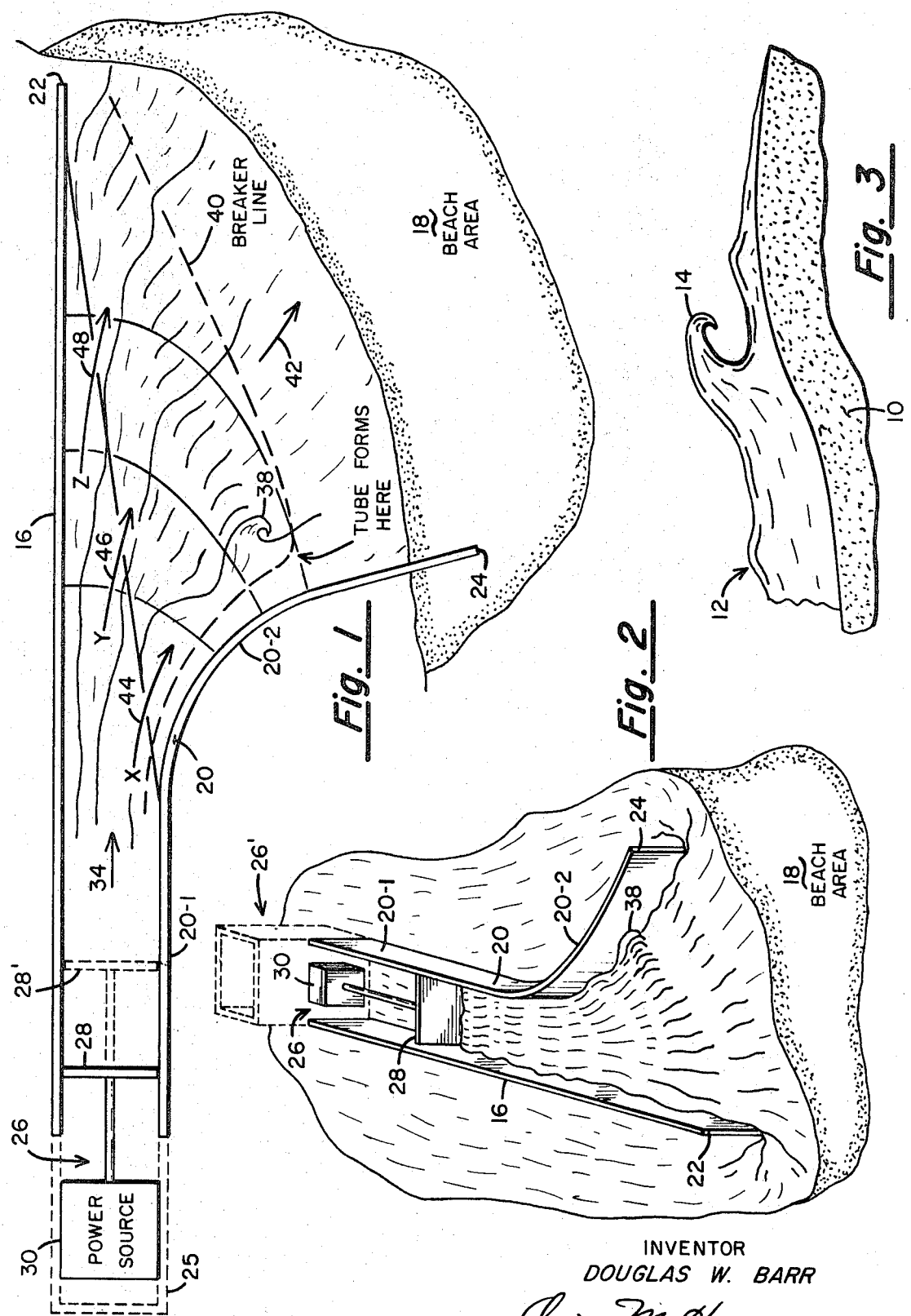
INVENTOR
DOUGLAS W. BARR
BY *Orrin M. Haugen*
ATTORNEY

United States Patent Office 3,557,559
Patented Jan. 26, 1971

3,557,559
WAVE-GENERATING APPARATUS
Douglas W. Barr, 5420 Irving Ave. S.,
Minneapolis, Minn. 55419
Filed May 12, 1969, Ser. No. 823,581
Int. Cl. E02b 3/00
U.S. Cl. 61—1                        9 Claims

ABSTRACT OF THE DISCLOSURE

Apparatus for generating waves in relatively small inland bodies of water, such as lakes, or large pools, for permitting surfing and the like, is described. The wave-generating apparatus includes means for defining the surfing area such as either one or a pair of vertical walls disposed in the water, with one of the walls or defining means being substantially straight and the second wall having a first portion arranged parallel to a portion of the first wall and a second portion arcuately diverging from said first wall in a manner to enhance the wave characteristics, and extending toward a beach area. The confined area is provided with a substantially flat or gradually inclining bottom or base, while the area defined adjacent the diverging walls is provided with an inclined bottom or base, so as to enhance the wave activity. A surge-generating device is located in the area where the first and second walls are parallel for imparting motion to the water therein, with breaking waves forming along the arcuate wall surface and propagating outwardly toward the first wall, while advancing along the inclined bottom and toward the batching area.

BACKGROUND OF THE INVENTION

(1) Field of the invention

This invention relates primarily to the field of wave-generating apparatus. More specifically, it relates to wave-generating apparatus utilizing a predetermined wall configuration for forming and propagating waves.

(2) Description of the prior art

The prior art has recognized the desirability of providing wave-generating apparatus for use in pools and inland lakes. These devices have ranged in the degree of sophistication and utilization from merely rolling a log into one end of a swimming pool for generating waves along the length thereof, to sophisticated arrangements of timed and phase-related plural propagation devices for use along extensive sections of beach. Others in the prior art have attempted to provide useful apparatus for generating waves in water by providing specially adapted bottom configurations, whereby breakers can be induced in response to surges of water being forced over these specially formed bottoms. Yet other prior art devices have been generated for use in test tanks for use in testing the response of various water structures and crafts to varying types of wave encounters. None of these prior art devices are adapted for generating waves on inland bodies of water that simulate the breaking waves similar to the surf of the ocean, to the extent that inland surfing can be achieved on a reasonable economic basis. The various pool and laboratory types of wave-generating apparatus do not lend themselves to large-scale construction that is required for propagating breaking waves along large expanses of beach area. Those devices that are capable of generating such extensive breaking waves are complex in the structural relationship required and the controls necessary for generating the timed surges of water for propagating the waves. Further, these prior art devices do not recognize the varying capabilities of surfers ranging from rank beginners to the very experienced; hence, they do not provide a propagated wave of varying break such that at various portions of the wave various surfing experiences can be achieved.

SUMMARY

In summary, then, this invention comprises an improved wave-generating apparatus for use with a body of water and includes confining means such as a pair of spaced, normally upright walls, placed in the body of water, these walls having vertical dimensions projecting a predetermined distance above the surface of the water, with one of the walls being generally straight and extending generally across a breaching area, and the second wall having a first portion parallel to a portion of said first wall and a second arcuate portion inwardly extending toward the beaching area, and a wave-generating power unit located between said parallel portions of the first and second walls for imparting motion to the water enclosed between the walls, with the motion outwardly extending, and breaking waves forming in the vicinity of the arcuate wall and extending outwardly across the beaching area.

In the generation of waves and wave motion, there are four factors which must be considered in order to define the shape and characteristics of the wave to be generated. These factors are as follows:

(1) Wave length,
(2) Frequency,
(3) Wave height,
(4) Depth of medium.

Generally, the wave length and frequency of a wave will define the celerity, which is a factor in wave motion. In order to provide a wave having desirable characteristics for surfing, it is generally desired to have a "tubular" type wave which provides the surfer with a desirable inclined wave surface for achieving his desired motion. When it is proposed to utilize a straight channel for the surfing medium, the wave formed cannot break except at a point adjacent the end of the channel, and this ordinarily provides a very limited range of motion for the surfer, and thus is ordinarily deemed undesirable. The apparatus of the present invention provides an opportunity to achieve tubular type waves, and also a breadth of wave which is sufficiently broad so as to provide a wide area for utilization.

It has been indicated that the surfing area must be confined between a pair of devices, such as spaced normally upright walls. It is possible to provide a pair of walls, each of which diverges outwardly, and each of which takes advantage of the inclined base at the point of departure from the straight to the arcuate surface. This feature will be described more fully hereinafter.

The base surface of the area between the confining walls is essentially flat from the area of the location of the wave generator, to the point where the arcuate surface commences. At this point, the base is inclined toward the beach area at a point removed from the arcuate wall, and continues its incline until the beach area is reached. This feature is illustrated in detail in FIG. 1 of the drawing.

It is a further feature of the invention that the arcuate wall extend in a direction which is substantially normal to the direction of wave motion. Thus, the arcuate wall is generally orthoganol to the axis of the generated wave.

The invention just described overcomes the disadvantages of the prior art in that sufficiently long breaking surf can be generated without requiring complex and extensive surge generators, and provides an induced breaking surf that varies in the degree of break from a severe, tubular or tubing wave, outwardly to a more gradual break, and yet farther outwardly to a swell, thereby providing varying degrees of wave action for accommodating the various skills of surfers. Further, as will be described in more detail below, it will be seen that there is a minimum of structure required for generating the improved waves when using this apparatus, as compared to the complex structures and surge-developing devices utilized in the prior art.

A primary object of this invention, then, is to provide an improved wave-generating apparatus.

Another object of this invention is to provide an improved wave-generating apparatus having a single wave-generating power unit for providing surges of water between parallelly arranged wall portions.

It is yet another object of this invention to provide an improved wave-generating apparatus having a pair of walls, with one of the walls extending generally across to a breaching area, and a second wall having an arcuate portion extending inwardly toward the beaching area.

Yet another object of this invention is to provide an improved wave-generating apparatus that is relatively inexpensive to construct, and does not require expensive control apparatus for obtaining desirable wave-generating operation.

Other more detailed and specific objectives will become apparent to those skilled in the art upon a consideration of the following detailed description of the preferred embodiment when viewed in light of the drawings, and the claims.

BRIEF DESCRIPTION OF THE DRAWINGS

FIG. 1 is a plan view of the improved wave-generating apparatus of this invention; FIG. 2 is a perspective view of the improved wave-generating apparatus of this invention, and illustrates the formation of the breaking waves along the arcuate inwardly projecting wall; and FIG. 3 is a view of a wave being formed into a breaking wave as it passes over the bottom toward a beaching area.

DESCRIPTION OF THE PREFERRED EMBODIMENT

The formation of waves, and breaker waves in nature is caused generally by the water being moved at the surface, at speeds different from the water thereunder. Generally, a breaker is formed when the base water of a wave traveling through a body of water impinges a relatively sharply inclining bottom or floor of the body of water upon which the wave is traveling. When this occurs, the motion of the wave base relative to the wave crest is retarded due to viscosity and the crest of the wave advances relative to the base until the latter is no longer capable of vertically supporting the crest. At such point, the water of the crest of the wave then spills over the wave front, and the wave is said to break. This can be seen by reference to FIG. 3 wherein the bottom 10 is inclined relatively sharply toward a beaching area, with the water 12 moving therealong. In the area of the breaker portion 14, it can be seen that the water is spilling over the supporting water, thereby forming an advancing breaker portion of the wave. As was mentioned above, various attempts in the prior art were made to provide special contours of the bottom for aiding in generating such breaker waves. Such specially contoured bottoms are impractical for long expanses of beach, and are unnecessary for use with this invention, with the flat bottom or gradually sloping area and the diagonally arranged relatively sharply upwardly sloping bottom in the breaking area being sufficient to use with this invention.

FIG. 1 and FIG. 2 should be viewed together in the following discussion, with the elements having the same reference numerals in both figures. It should also be understood, that the drawings are not dimensioned, but are intended to illustrate the inter-relationship of the elements, together with their respective operating principles. Various alterations in dimensioning and location can be accomplished for utilizing this improved wave-generating apparatus in various sizes of bodies of water. As is apparent, the arcuate section is shown extending to the right in FIG. 1 and to the left in FIG. 2, thereby indicating that this choice is reversible, and will depend on the locality of installation.

In the event it is desired to utilize a larger area, a pair of arcuate walls may be formed, each diverging, one from another, with the straight wall section shown in FIGS. 1 and 2 being removed. In other words, a pair of areas may be arranged in side-by-side relationship, each being substantially the mirror-image of the other.

In FIG. 1 there is shown a plan view of the improved wave-generating apparatus of this invention, and in FIG. 2 there is shown a perspective view of the wave-generating apparatus. The wave-generating apparatus includes a first wall member 16 extending generally across a beaching area 18. Wall member 16 is normally located in the flat bottom or gradually inclined area of relatively deep water, and is supported by the bottom that supports the body of water. Wall member 16 has an upper portion extending above the normal surface level of the water. A second wall member 20 is also vertically dimensioned to have a portion protruding above the normal surface level of the water, normally supported by the bottom, and has a first portion 20-1 arranged parallel to a portion of wall member 16 for forming a surge channel therebetween. Wall member 20 has a second arcuate portion 20-2 extending away from said first wall member 16 and extending generally along the inclined bottom toward said beaching area 18. In the embodiment shown, the ends 22 and 24 of wall members 16 and 20, respectively, extend completely to the beaching area 18 to prevent water that is urged up onto the beaching area from gaining access to either side of wall members 16 and 20. This arrangement is shown for use in either artificial or natural bodies of water, where the water that is to be utilized for the waves that are to be generated, is preferably totally contained between wall members 16 and 20. For those arrangements wherein the improved wave-generating apparatus is to be utilized in a large pool-type structure, the end of the surge channel is preferably closed, as indicated by dashed lines 25.

A surge-generating means 26 is positioned between the parallel portions of wall members 16 and 20 for causing surges of water between these wall members when activated. Various types of surge-generating devices are shown in the prior art, many of which could be accommodated to use in this improved wave-generating apparatus. Either ram-type or pumping pressure discharge types could be utilized. The type illustrated in the figures, includes a ram portion 28 coupled to a power source 30. The power source is preferably a steam generator, although other types may be used effectively. The operation is such that when activated, power source 30 thrusts the ram member 28 outwardly to the position illustrated in dotted line in FIG. 1 and referred to as 28'. The movement from the retracted position of ram 28 to the extended position of ram 28' causes a surge of water to be forced between wall members 16 and 20. When the surge has been generated, the power source 30 retracts the ram member 28 from its extended position. The depth that ram member 28 will extend downwardly into the water, will depend upon the overall dimension of the wave-generating apparatus, but is preferably substantially the entire depth of water in that zone. This depth will also depend upon the amount of water that is desired to be expelled from the wave-generating apparatus, and will thereby determine the nature of the wave that will be generated. It is of course readily apparent, that the more water that is to be moved due to a greater depth of ram member 28, the more power that will be required from power source 30. It is of course also apparent that the power will depend upon the overall width between wall members 16 and 20. As indicated above, the surge-generating means 26 can include a plunger type activator, moving vane-type activator, or other devices illustrated in the prior art. Additionally, as suggested above, the power source 30 can be an engine-driven gear train, a steam-driven device, or electrically-driven power source.

The dimensioning of wall members 16 and 20 and their relative positioning is adjusted to accommodate the size of the body of water in which the wave-generating apparatus is to be utilized. For beach areas, it is characteristically desirable to provide waves having a substantial length so that many swimmers and surfers can utilize the same wave. For example, waves of length of 100 yards or more measured normal to the direction of motion have been found to be advantageous. The prior art devices of a unitary nature have been unable to provide such wave sizes and lengths, and those multiple units that are capable of production of such waves are not economically feasible due to their complexity and economic expense of installation. The height of the waves will be governed by the amount of water moved by ram 28, and the speed with which it is moved.

When constructed as illustrated in FIGS. 1 and 2, and when a surge is imparted by the movement of ram 28 to the ram 28' position, a surge of water is directed in the direction of arrow 34. As the wave motion moves out of the opening of the surge channel, into the vicinity of the start of the arcuate portion 20-2 of wall member 20, the expanse of the wave encounters varying conditions along its length. For example, that portion adjacent the arcuate area or portion 20-2 is encountering a rapidly inclining bottom zone, while that portion adjacent the wall 16 is substantially unaffected by the flat bottom or gradually sloping bottom available there. Due to this varying condition of inclining bottom areas, a breaking wave 38 is formed in an area adjacent to the arcuate portion 20-2 of wall member 20. Of course, there will be a similar gradient of deceleration of the water as the distance from wall member 20 increases in a direction toward the wall member 16. The breaking wave 38, or so-called tube, tends to propagate along a wave front defined by breaker line 40, represented by the dashed line extending across the beaching area. The axis of the individual breaker waves will extend substantially parallel to the line defining the break in bottom structure, that is, from a gradually inclining area to a steeper inclining area, as illustrated. As the breaker 38 propagates along the wave front 40, it tends to decrease gradually from a sharply breaking wave to a surging swell. As breaking wave 38 propagates along the breaker line, it simultaneously advances in the direction of arrow 42 toward beaching area 18.

The line at demarkation between flat or gradually sloping bottom and sharply inclined bottom is arranged generally normal to the surface of the arcuate wall 20-2, at a point reasonably closely adjacent to the portion where the arcuate turn commences. The incline demarkation line preferably extends generally normal to the arcuate wall 20-2 until it encounters or intersects the oppositely disposed wall area 16. This arrangement of the structure thereby enhances the efficiency of the system with regard to the creation of breakers of the tube or tubular form, these breakers accordingly being formed with a minimum of input energy required.

Alternatively to providing surge-generating means 26, a reservoir 26', as shown in dashed line in FIG. 2, can be located at the outer end of the surge channel. Such a reservoir would be of sufficient height to hold a substantial head of water, and would include an actuatable closure device near the normal surface of the water in the surge channel. Thus, when the reservoir is filled to the desired head, and the closure device is opened, there is a surging flow of water outwardly in the surge channel, resulting in a water movement similar to that derived by the use of the surge-generating means. In this alternative arrangement, a considerably lower peak demand of power is required in that it need only be enough to run a pump, or the like, for filling the reservoir, and have sufficient power to open and close the closure device.

In utilizing the wave-generating apparatus, the experienced surfer starts in the vicinity of X and rides the sharply breaking wave in the direction of arrow 44 staying fairly close to the arcuate portion 20-2 of wall member 20, thereby experiencing the sharpest breaking portion of wave 38. The surfer will normally continue his ride by following a path generally along the extent of the breaker line 40 terminating adjacent the wall end 22. Less experienced surfers may start in the vicinity of Y and ride in the general direction of arrow 46 on the sharply surging portion of the wave 38. Beginners may start in the vicinity of Z and ride in the direction of arrow 48 on the less violently surging portion of the wave 38. Thus, many persons can simultaneously utilize a single wave surge as generated by the wave-generating apparatus, without experiencing the danger of collision with wall members 16 and 20.

EXAMPLE A

In a typical installation, for a 6-foot plunging or tubular type wave to be generated, the following system is deemed appropriate and may be utilized for purposes of illustration. The surge generating channel is 60 feet wide and has a depth of 17 feet, the bottom of the surge generating channel being substantially flat. The beach length is 207 feet. Seven-foot surges are generated on a 10 second period or function. The flat or gradual incline area extends from the generator at a substantially constant depth until the demarkation line is reached, this line extending from the point where the arcuate surface commences from the surge chamber, and orthogonally therefrom over to the oppositely disposed side wall. This line is indicated in the drawings. At this point, an inclined slope is commenced at a rate of 1:50, until the beach area is reached.

Generally speaking, the sharp incline should be at the rate of 1:50, and greater; and may, in certain instances, be at the rate of 1:30 or more. This rate of incline will be sufficient for most installations where plunging breakers are desired.

As illustrated, when used in a natural body of water, wall member 16 acts as a breaker for beaching area 18 for protecting the beaching area from naturally generated waves due to windy conditions and the like, when it is desired that casual swimming be done inside of wall member 16.

In view of the foregoing, it can be seen that the various stated objectives and purposes have been accomplished through apparatus described in detail, and recognizing that various modifications in proportioning, detail structure, and the like, will become apparent to those skilled in the art, what is intended to be protected by Letters Patent is set forth in the appended claims.

I claim:

1. Wave-generating apparatus for generating waves in a body of water comprising:
   (a) means defining a surge channel and a surfing zone in continuation therewith, said surge channel comprising a pair of generally parallelly disposed and vertically inclined wall members extending from the bottom surface of said surge channel to a height projecting above the normal water surface with said bottom surface being generally flat in said surge channel area;
   (b) said surfing zone comprising first and second opposed surfing zone confining wall members extending in continuation with the walls of said surge channel, said first surfing zone wall member having an arcuate portion diverging from said second surfing zone wall member;
   (c) bottom surface means adjacent said arcuate portion and directed orthogonally toward said second surfing zone wall member and defining a slope demarkation line with the second surfing zone wall member being substantially straight from said surge channel to the intersection of said second surfing zone wall member with said slope demarkation line; and (d) the inclining slope of the bottom being steeper toward the beach area from said demarkation line than from said surge channel to said demarkation line, and surge-generating means positioned between the parallel portions of said first and second wall members for causing surges of water in said surge channel, said surges of water generating wave motion at the surface of the water as said surges of water break along said arcuate portion of said first surfing zone wall member, said wave motion propagating outwardly from said arcuate portion.

2. Wave-generating apparatus as in claim 1 wherein said surge-generating means includes power source means for generating surges of power, and ram means coupled to said power source means for generating surges of water when moved by said power source means.

3. Wave-generating apparatus as in claim 1 wherein said first surfing zone wall member extends across a substantial length of beaching area.

4. Wave-generating apparatus as in claim 1 wherein the arcuate portion of said first surfing zone wall extends generally inwardly towards said beaching area for causing said wave motion to propagate generally across said beaching area while advancing towards said beaching area.

5. Wave-generating apparatus as in claim 4 wherein said wave motion is sharply breaking near the arcuate portion of said first surfing zone wall and progressively less sharply breaking in the direction of propagation for forming varying degrees of wave characteristics along the axial length of said waves.

6. Wave-generating apparatus as in claim 5, and further including end-closure means for joining the ends of the wall members forming said surge channel in the vicinity of said surge-generating means for forming a substantially water-tight closure.

7. Wave-generating apparatus as in claim 5 wherein said surge-generating means includes accumulator means for holding a head of water at a pressure level above that of the normal water level, said accumulator means including actuatable closure means for releasing said head of water between said first and second wall members for providing said surges of water.

8. Wave-generating apparatus comprising:
(a) surge channel means for carrying surges of water, said surge channel means having a discharge opening;
(b) surge-generating means in cooperation with said surge channel means for generating surges of water therein toward said discharge opening; and
(c) first and second normally upright wall members, each being vertically dimensioned to project above the normal water surface and arranged in continuation with said discharge opening, one of said wall members extending generally across a substantial length of beaching area, and said second wall member including an arcuate portion extending generally inwardly toward said beaching area, said surges of water carried through said discharge opening generating wave motion at the surface of the water as said surges of water break along said arcuate portion of said second wall member, said wave motion propagating outwardly from said arcuate portion, while advancing toward said beaching area.

9. Wave-generating apparatus as in claim 8 wherein said surge channel means includes a pair of spaced apart side members projecting above the normal water surface, one of said pair cooperating with said first wall member, and the other of said pair cooperating with said second wall member.

References Cited
UNITED STATES PATENTS

| | | | |
|---|---|---|---|
| 586,983 | 7/1897 | Wharton, Jr. | 4—172.16 |
| 1,871,215 | 8/1932 | Keller et al. | 4—172.16 |
| 3,005,207 | 10/1961 | Matrai | 4—172.16 |
| 3,473,334 | 10/1969 | Dexter | 61—1 |
| 3,477,233 | 11/1969 | Andersen | 61—1 |

PETER M. CAUN, Primary Examiner

U.S. Cl. X.R.

4—172.16